(12) United States Patent
Jasper et al.

(10) Patent No.: US 9,386,015 B2
(45) Date of Patent: *Jul. 5, 2016

(54) SECURITY MODEL FOR INDUSTRIAL DEVICES

(71) Applicant: Rockwell Automation Technologies, Inc., Mayfield Heights, OH (US)

(72) Inventors: Taryl J. Jasper, South Euclid, OH (US); Michael B. Miller, West Allis, WI (US); Robert A. Brandt, Menomonee Falls, WI (US)

(73) Assignee: ROCKWELL AUTOMATION TECHNOLOGIES, INC, Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,376

(22) Filed: Apr. 22, 2015

(65) Prior Publication Data

US 2015/0229640 A1 Aug. 13, 2015

Related U.S. Application Data

(63) Continuation of application No. 13/934,701, filed on Jul. 3, 2013, now Pat. No. 9,043,600, which is a continuation of application No. 12/905,676, filed on Oct. 15, 2010, now Pat. No. 8,504,837.

(51) Int. Cl.
*H04L 9/32* (2006.01)
*H04L 29/06* (2006.01)
*G06F 21/34* (2013.01)

(52) U.S. Cl.
CPC ............ *H04L 63/0853* (2013.01); *G06F 21/34* (2013.01); *H04L 63/20* (2013.01)

(58) Field of Classification Search
CPC ................................ G06Q 20/367; G07F 7/08
USPC .......................................................... 713/172
See application file for complete search history.

(56) References Cited

U.S. PATENT DOCUMENTS 7,657,932 B2 * 2/2010 Ballinger ............ H04L 63/0823
713/172
2004/0093515 A1 5/2004 Reeves et al.
(Continued)

FOREIGN PATENT DOCUMENTS

| CN | 1889452 A | 1/2007 |
| TW | 201032597 | 9/2010 |
| WO | 2008116760 A2 | 10/2008 |

OTHER PUBLICATIONS

Protocol Buffers—Developer Guide http://code.google.com/apis/protocolbuffers/docs/overview.html. Last accessed Feb. 15, 2011. 4 pages.

(Continued)

*Primary Examiner* — Anthony Brown
(74) *Attorney, Agent, or Firm* — Amin, Turocy & Watson, LLP

(57) ABSTRACT

Systems and/or methods are described relating to a security model that provides interoperability with foreign security domains while remaining scalable to small embedded devices. A security token service is provided, which is configured to issue, renew, and/or validate security tokens in response to a token request. A communication protocol, corresponding message structures, and the security tokens are defined in accordance with protocol buffer definitions.

20 Claims, 10 Drawing Sheets

(56) References Cited

U.S. PATENT DOCUMENTS

| | | | |
|---|---|---|---|
| 2004/0128542 | A1 | 7/2004 | Blakley et al. |
| 2004/0128543 | A1 | 7/2004 | Blake et al. |
| 2006/0005234 | A1* | 1/2006 | Birk ................ H04L 63/0815 726/9 |
| 2009/0007253 | A1 | 1/2009 | Chung et al. |
| 2009/0271012 | A1* | 10/2009 | Kopka ............. G06F 17/30905 700/83 |
| 2010/0268952 | A1* | 10/2010 | Chung ................. H04L 9/3236 713/170 |
| 2011/0131643 | A1* | 6/2011 | Lawrence ............ H04L 9/3213 726/10 |

OTHER PUBLICATIONS

Protocol Buffers—FAQ http://code.google.com/apis/protocolbuffers/docs/faq.html. Last accessed Feb. 15, 2011. 2 pages.

Oasis WS—Trust 1.4. Feb. 2, 2009. http://docs.oasis-open.org/ws-sx/ws-trust/v1.4/os/ws-trust-1.4-spec-os.pdf. Last accessed Feb. 15, 2011, 85 pages.

Oasis—Web Services Security: SAML Token Profile. Oasis Standard, Dec. 1, 2004. http://docs.oasis-open.org/wss/oasis-wss-saml-token-profile-1.0.pdf. Last accessed Feb. 15, 2011, 31 pages.

European Search Report for European Patent Application No. EP11185481 dated Feb. 28, 2012, 6 pages.

Office Action for U.S. Appl. No. 12/905,676, dated Jul. 20, 2012, 33 pages.

Office Action for U.S. Appl. No. 12/905,676, dated Jan. 7, 2013, 22 pages.

Office Action for U.S. Appl. No. 13/934,701, dated Aug. 6, 2014, ?? pages.

Chinese Office Action for Chinese Application No. 201110323926.0 dated Oct. 29, 2013, 28 pages.

Chinese Office Action for Chinese Application No. 201110323926.0 dated Sep. 12, 2014, 6 pages.

U.S. Appl. No. 13/934,701, filed Jul. 3, 2013.

U.S. Appl. No. 12/905,676, filed Oct. 15, 2010.

European Office Action for European Patent Application No. EP11185481 dated Feb. 16, 2016, 5 pages.

Taiwanese Office Action dated Jul. 24, 2015 for Taiwanese Application Serial No. 100137493, 5 pages.

* cited by examiner

SECURITY MODEL FOR INDUSTRIAL DEVICES

PRIORITY CLAIM

This patent application is a continuation of U.S. patent application Ser. No. 13/934,701, filed Jul. 3, 2013 and entitled, "SECURITY MODEL FOR INDUSTRIAL DEVICES," which is a continuation of U.S. patent application Ser. No. 12/905,676, filed Oct. 15, 2010 and entitled "SECURITY MODEL FOR INDUSTRIAL DEVICES." The entireties of each are incorporated herein by reference.

TECHNICAL FIELD

The subject disclosure relates to a security model for an industrial automation environment, and more particularly, to an interoperable security model suitable for embedded industrial automation devices.

BACKGROUND

Security is an important aspect in industrial automation environments. Access to machines and devices within a factory or other automation environment should be controlled to avoid unauthorized or inappropriate interactions with the machines and devices by persons lacking proper training, authority, or credentials. In addition, operations on machines and devices should be strictly controlled to provide various levels of permissions to different persons having disparate roles with the industrial automation environment. To implement the aforementioned security features, an operator, when accessing a machine or device in the industrial automation environment, can supply credentials specifying an identity of the operator. The machine or device, once the credentials are validated, can grant rights to the operator and enable access to features based upon permissions associated with the operator.

Commonly, industrial automation environments employ proprietary security solutions within the environment. The proprietary security solutions may not interoperate or trust foreign security domains. Without interoperation, the industrial automation environment resides on a security island.

In other areas, such as web services, a set of standard security-related specifications have emerged. For web services, in particular, the Organization for the Advancement of Structured Information Standards (OASIS) has promulgated a variety of specifications, such as WS-Security, WS-Trust, SAML, etc., that relate to implementing security features (e.g., authentication, trust building) between loosely coupled systems. More particularly, WS-Security is a specification that provides a basic framework for message level security in web services. WS-Trust extends WS-Security and provides a framework to establish or broker trust among disparate security domains. SAML (Security Assertion Markup Language) is an XML-based standard for representing security claims or assertions. The aforementioned standards are intended for use by enterprise level systems (e.g., large web servers, powerful general purpose computers, etc.) as they rely upon Internet-based technologies, such as HTTP, SOAP, XML, etc. Such Internet-based technologies, however, require tremendous resources, and, as such, do not scale to small embedded systems having limited processing capabilities, limited memory, etc.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

According to various aspects, a security model is described that provides interoperability with foreign security domains while remaining scalable to small embedded devices. A security token service is provided, which is configured to issue, renew, and/or validate security tokens in response to a token request. A communication protocol, corresponding message structures, and the security tokens are defined in accordance with protocol buffer definitions.

According to a first aspect, the security token service is integrated within an embedded device. The embedded device can be an industrial automation device within an industrial automation environment. The security token service, within the device, can authenticate and authorize a user interfacing directly with the embedded device. The embedded device includes account information stored thereon to facilitate authentication and authorization by the security token service.

According to a second aspect, the security token service is integrated within a network appliance. The security token service can obtain token requests transmitted by devices via a network. The network appliance can include account information stored thereon to enable the security token service to authenticate and authorize users based upon the token requests. The security token service can issue security tokens and transmit the tokens, via the network, to various devices.

According to a third aspect, the security token service can be associated with a gateway device on a network. The gateway device communicates with an external entity to authenticate and authorize users. The communication can be based upon the WS-Trust specification. The gateway device can translate security tokens and/or token requests between an XML representation specified by WS-Trust and the protocol buffer definitions.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
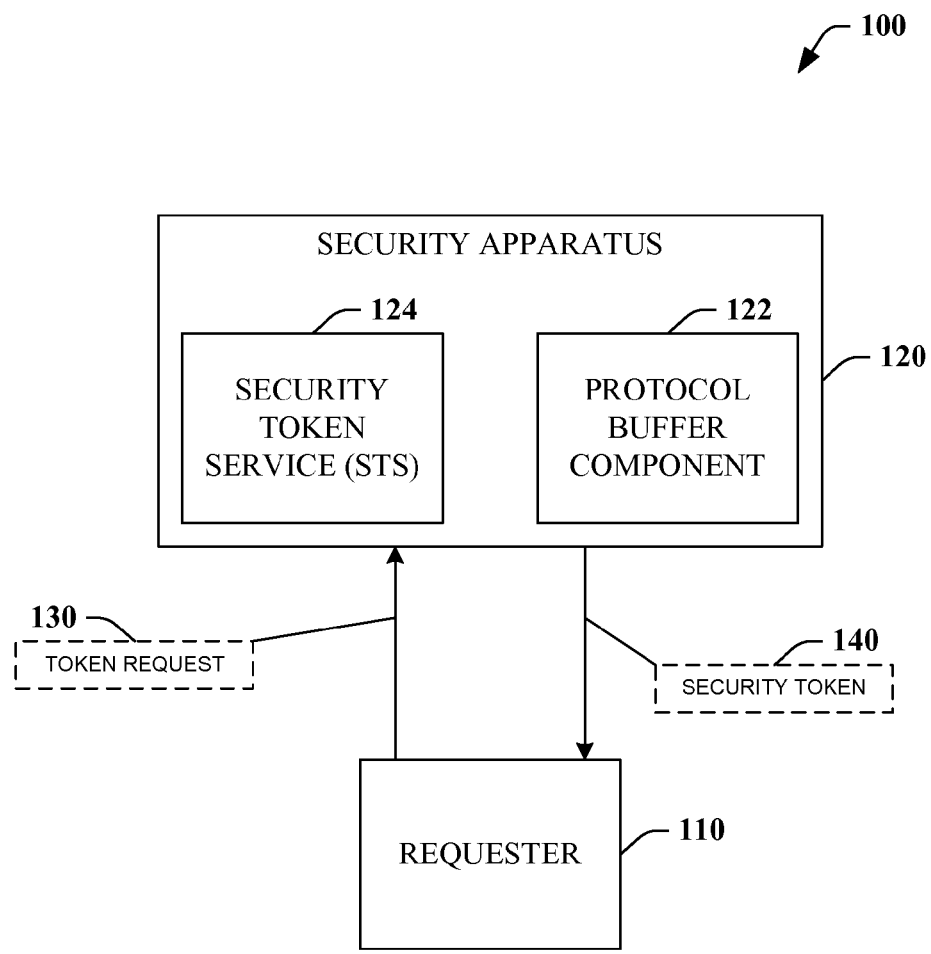
FIG. 1 illustrates a block diagram of an example system that employs a security token service to issue, renew, and validate security tokens in accordance with various aspects.

Various aspects are now described with reference to the drawings, wherein like reference numerals are used to refer to like elements throughout. In the following description, for purposes of explanation, numerous specific details are set forth in order to provide a thorough understanding of one or more aspects. It will be evident, however, that such aspect(s) can be practiced without these specific details. In other instances, well-known structures and devices are shown in block diagram form in order to facilitate describing these aspects.

Referring initially to FIG. 1, illustrated is an exemplary system 100, according to an aspect. System 100 is configured to utilize security tokens to facilitate identification, authentication, and authorization of users. In an aspect, a security token includes a set of claims or assertions that specify a variety of information. For instance, a security token can include a name, a role, an authorization code, an indication that the name is authenticated, a time of authentication, a list of permitted actions, cryptographic key information, or the like. It will be appreciated from the description below, however, that security tokens can include additional information to that delineated above.

System 100 is configured to provide delegation of authentication, authorization, etc, of users and can include a requester 110 configured to obtain a security token from a security apparatus 120. Requester 110 can be an entity configured to interact with a user (not shown). Requester 110 can employ security apparatus 120 to authenticate the user. In accordance with one example, wherein system 100 is deployed within an industrial automation environment, requester 100 can be a industrial automation device or tool such as, but not limited to, a controller (e.g., programmable automation controller (PAC), programmable logic controller (PLC), and so forth), a human machine interface (HMI), an industrial machine, or the like.

Requester 110 obtains credential information from a user desiring to access some functionality provided by requester 110. The credential information can be a username/password pair, a security token, a Kerberos ticket, etc. Requester 110 issues a token request 130, to the security apparatus 120, that includes at least a portion of the credential information. In response, the security apparatus 120 can provide a security token 140 to the requester 110. Security token 140 can indicate, at least, whether the credential information is authentic. According to additional aspects, the security token 140 can include attributes of the user, permitted actions the user is authorized to perform, a role of the user, an identity of the user, and so on.

The requester 110 and the security apparatus 120 can utilize protocol buffers to implement and convey the token request 130 and the security token 140. Protocol buffers are a language-neutral, platform-neutral, extensible mechanism to serialize structured data for use in communications protocols. One or more protocol messages can be defined that specify how information is to be structured. Each protocol message can include a set of name-value pairs respectively having a name and a value type. Value types can include numbers (e.g., integers or floating point values), Booleans, strings, raw bytes, and the like. In addition, value types can also include other protocol messages. Accordingly, protocol buffers enable information to be structured hierarchically.

Once protocol messages are defined, the definitions can be run through a protocol buffer compiler to automatically generate data access mechanisms as well as serialization/de-serialization mechanisms. The serialization/de-serialization mechanisms are configured to convert a protocol message object (e.g., an object instance of the protocol message populated with actual data) into a protocol buffer (e.g., raw bytes) and convert the protocol buffer into the protocol message object. The data access mechanisms facilitate retrieval and setting of values associated with a particular name-value pair, protocol message objects, in accordance with the structure of the protocol messages.

With protocol buffers, a protocol message defining a structure for token request 130 can be created. The protocol message corresponding to token request 130 can be compiled to generate data access and serialization/de-serialization mechanisms employable by requester 110 and security apparatus 120. Similarly, a protocol message, defining a structure for security token 140, can be provided and compiled to generate corresponding data access and serialization/de-serialization mechanisms.

In addition to structures for information (e.g., protocol messages), protocols buffers enable definitions of services. For example, a service can be established that utilized defined protocol messages, such a token request protocol message and a security token protocol message. The service definition can be compiled to generate an abstract interface, which can be implemented as part of a remote procedure call or other communication protocol to exchange information between multiple entities.

With a service defined and/or protocol messages for token request 130 and security token 140, requester 110 can instantiate a token request protocol message object and populate the object with information such as the credential information. The token request protocol message object can be serialized into a series of raw bytes to generate token request 130. Requester 110 can convey token request 130 to the security apparatus 120 via a remote procedure call or other communication protocol.

Security apparatus 120 can receive token request 130 as a series of raw bytes. Security apparatus 120, in an aspect, can include a protocol buffer component 122 configured to manage protocol messages, such as token request 130 and security token 140. The protocol buffer component 122 instantiates a protocol message object based upon the corresponding protocol message of token request 130. Protocol buffer component 122 de-serializes token request 130, obtained from requester 110, and populates the instantiated protocol message object with the de-serialized token request. Information contained within the de-serialized token request 130 (e.g., credential information) can be provided to a security token service (STS) 124.

STS 124 is configured to issue, validate, and/or renew security tokens. The security tokens include one or more claims or assertions determined by STS 124 based upon credential information. According to an example, STS 124 obtains credential information from protocol buffer component 122. The credential information can be extracted from token request 130. STS 124 can authenticate the credential information and issue a corresponding security token that includes at least a claim indicating that the credential information is authenticated.

Authentication can occur in accordance with a variety of schemes. In one example, the credential information can include a username and password. STS 124 can check the username and password against a data store (not shown) that retains user information. The data store can be associated with security apparatus 120 or, as described in greater detail below, associated with a remote entity such as an external identity provider. In another example, the credential information can include a security token previously issued from STS 124. STS 124 can issue a new token or renew the token included in the credential information. In yet another example, the credential information can include a security token from another entity. STS 124 can issue a security token based upon the claims in the provided token when the token is issued from a trusted entity.

STS 124 can generate issued tokens in accordance with a structure defined by a protocol message for security tokens. Issued tokens, such as security token 140, can be serialized by protocol buffer component 122 and conveyed to requester 110 in response to token request 130. The requester 110 can de-serialize security token 140 and render access decisions based at least in part on claims included in the security token 140. For instance, requester 110 can permit a user to perform certain operations authorized by claims in the security token 140.

While shown as separate components in FIG. 1, it is to be appreciated that protocol buffer component 122 can be included in or combined with STS 124, such that STS directly communicates with requester 110 in accordance with protocol buffer mechanisms. In addition, it is to be appreciated that security apparatus 120 can be STS 124 itself. Further, additional security, such as encryption, digital signatures, or the like, can be layered upon the message exchange between requester 110 and security apparatus 120.

Figure 2:
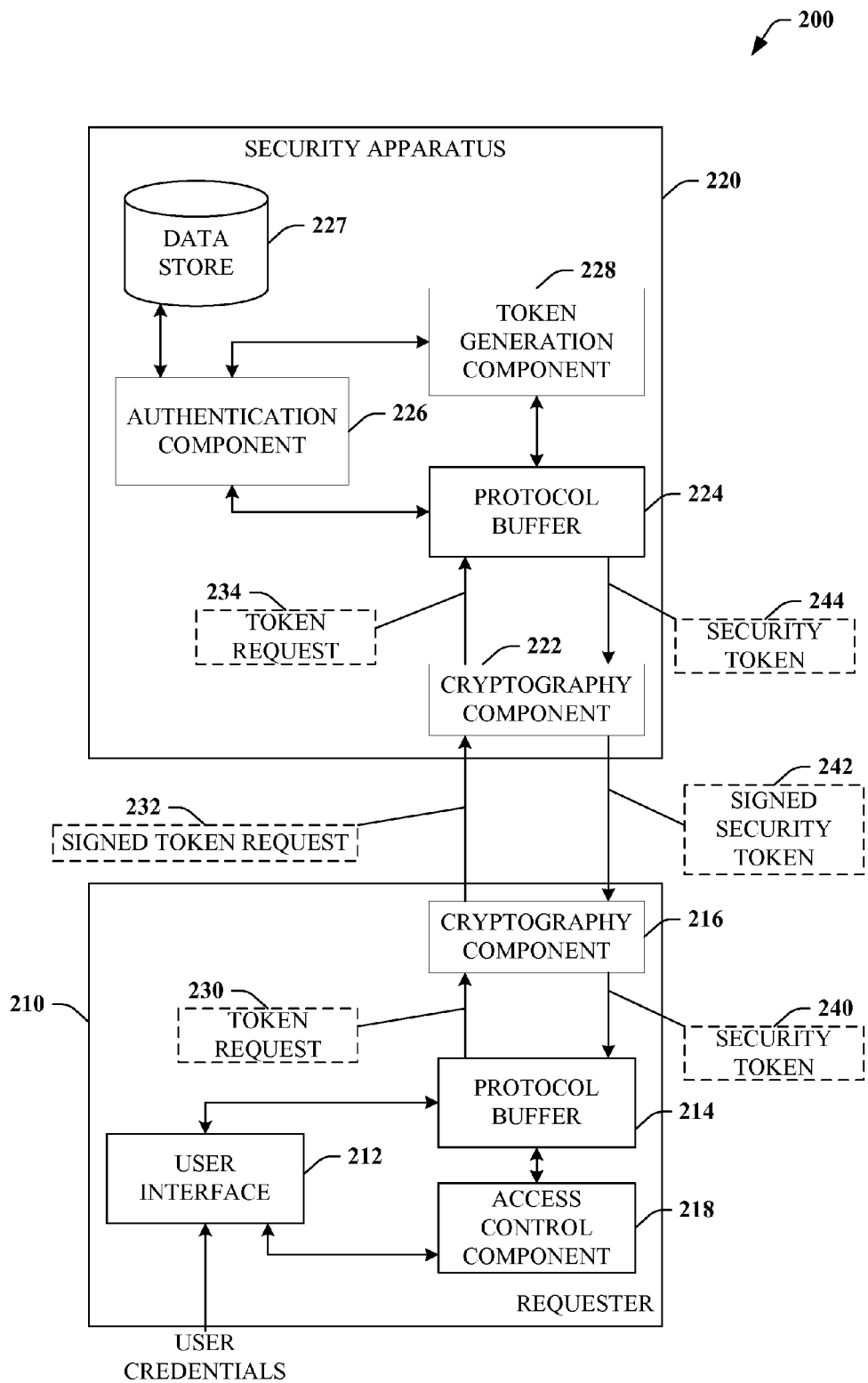
FIG. 2 illustrates a block diagram of an example system in which a security token service is employed to identify and authenticate a user in accordance with various aspects.

FIG. 2 illustrates a system 200 in which a security token service is employed to identify and authenticate a user in accordance with various aspects. As illustrated in FIG. 2, system 200 can include a requester 210 configured to communicate with a security apparatus 220 to authenticate and/or authorize a user accessing requester 210. In an aspect, security apparatus 220 can be configured as a security token service as described above. As a security token service, security apparatus 220 is configured to issue, renew, and/or validate security tokens. The security tokens can be utilized by requester 210 to render and enforce access decisions with respect to users.

In an aspect, requester 210 can include a user interface 212 configured to obtain input from a user and convey output to the user. The user interface 212 can include a variety of hardware and/or software components. For example, the user interface 212 can include a keyboard, a mouse, a touch screen or display screen displaying a graphical user interface (GUI) generated by software applications, a microphone, speakers, a video camera, etc.

Requester 210 can further include a protocol buffer 214 configured to structure information in accordance with protocol messages, such as token request 230 and security token 240, serialize protocol messages into series of bytes, de-serialize byte streams into structured information, and extract data from the structured information. Protocol buffer 214 facilitates communication between requester 210 and security apparatus 220 through remote procedure calls or other communication protocols.

In addition, requester 210 can include a cryptography component 216 configured to provide cryptographic functions, such as digital signatures, encryption, etc. In an aspect, cryptography component 216 can digitally sign protocol messages generated by protocol buffer 214 prior to sending the protocol messages to security apparatus 220. In addition, cryptography component 216 can authenticate and integrity check signed protocol messages received from security apparatus 220.

According to another aspect, requester 210 can include an access control component 218 configured to render access decisions based, at least in part, on security tokens obtained from the security apparatus 218. For instance, access control component 218 can determine whether or not to grant access to a user based upon the security tokens. In addition, access control component 218 can restrict access to particular functions or features based upon the security tokens. In an example, access control component 218 can analyze a security token and ascertain that a user is authenticated and can be granted access. The access control component 218 can further evaluate claims included in the security token to determine a role associated with the user and/or identify authorized actions the user permitted to initiate. Access control component 218 can configure user interface 212 to facilitate enforcement of access restrictions based upon the role of the user or the authorized actions.

Security apparatus 220 can include a cryptography component 222 configured to provide cryptographic functions, such as digital signatures, encryption, etc. In an aspect, cryptography component 222 can digitally sign protocol messages prior to sending to such messages to requester 210. In addition, cryptography component 220 can authenticate and integrity check signed protocol messages received from requester 210. Security apparatus 220 can also include a protocol buffer 224 configured to structure information in accordance with protocol messages, such as token request 230 and security token 240, serialize protocol messages into series of bytes, de-serialize byte streams into structured information, and extract data from the structured information. Protocol buffer 224, similar to protocol buffer 214 of requester 210, facilitates communication between requester 210 and security apparatus 220 through remote procedure calls or other communication protocols.

In accordance with another aspect, wherein security apparatus 220 operates as an identity provider, an authentication component 226 is provided. Authentication component 226 is configured to verify credential information, which can be provided to security apparatus 220 by requester 210 as part of a token request. Authentication component 226 can query a data store 227 that retains account information. Authentication component 226 can validate credential information when such information is included and/or matches information in data store 227.

A result of authentication by the authentication component 226, the token request processed by protocol buffer 224, and credential information contained in the token request can be provided to a token generation component 228. The token generation component 228 is configured to issue security tokens, based at least in part, on the result of authentication, the credential information and/or the token request. In one aspect, token generation component 228 can issue protocol buffer security tokens that conform to a structure defined by a protocol message employable by protocol buffer mechanisms. However, it is to be appreciated that token generation component 228 can issue other tokens such as, for example, a SAML token.

Figure 3:
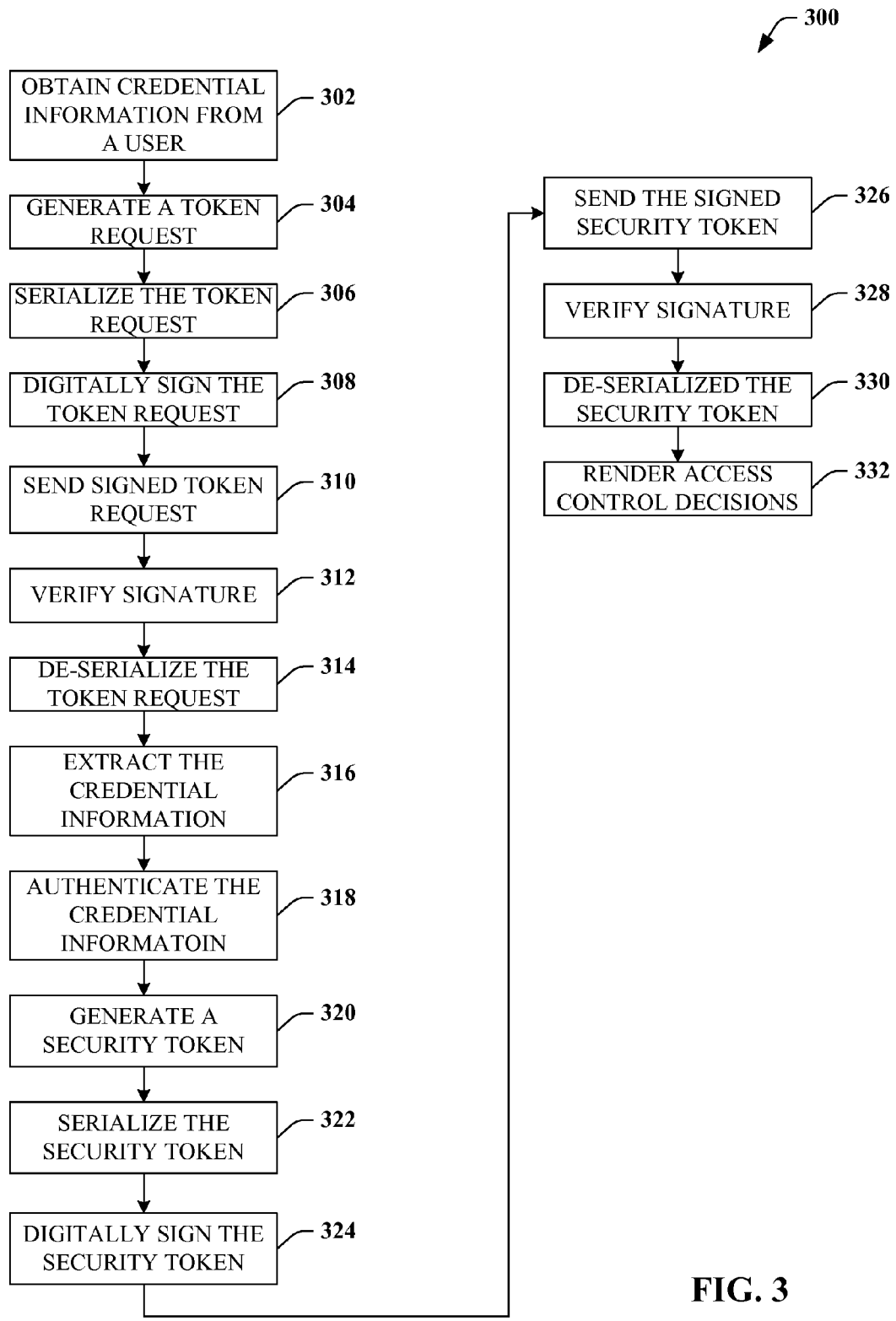
FIG. 3 illustrates a flow diagram of an example method for authenticating users and issuing security tokens in accordance with various aspects.

Referring to FIG. 3, in connection with FIG. 2, a methodology 300 related to authenticating a user and issuing a security token is described. While, for purposes of simplicity of explanation, the processes or methodologies are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

At 302, a user, desiring to access requester 210, can input credential information via user interface 212. At 304, requester 210 can employ the protocol buffer 214 to generate token request 230 that includes the credential information. In an aspect, the token request 230 can information structured in accordance with a protocol message defined in accordance with the protocol buffer technology. At 306, the protocol buffer 214 serializes token request 230 from a structured object to a series of raw bytes.

At 308, cryptography component 216 can digitally sign token request 230 to generate signed token request 232. In one example, cryptography component 216 can utilize public-key cryptography to sign token request 232. For instance, cryptography component 216 can hash token request 230 to generate a message digest. The message digest can be encrypted with a private key to produce a signature, which is attached to the token request 230 to generate the signed token request 232. At a receiver end, the signed token request 232 is separated (e.g., the signature is extracted from token request 230). The signature is decrypted with a public key paired to the private key. In addition, the token request, with signature removed, is hashed. The signed token request 232 is authenticated and checked when the hash and the decrypted signature match. Public key cryptography is described herein as an exemplary algorithm and it is appreciated that other cryptographic algorithms can be employed and, further, it is intended that the claims appended hereto are not limited to public-key cryptography.

At 310, the signed token request 232 is sent to the security apparatus 220. As described in more detail below, the signed token request 232 can be conveyed to the security apparatus 220 via a variety of means depending on the specific implementation of security apparatus 220 and requester 210. For example, request 210 can send the signed token request 232 via a remote procedure call, a pipe between processes, a network connection, a hardware bus, a method call, etc.

At 312, cryptography component 222 of security apparatus 220 can verify the signed token request 232 and recover a token request 234. As described above, cryptography component 222 can, in one example, employ a public key associated with requester 210 and paired with a private key of requester 210. At 314, the token request 234 is de-serialized by protocol buffer 224 to convert the series of raw bytes into a structured object that includes the credential information. At 316, security apparatus 220 can employ the protocol buffer 224 to extract the credential information from the structure object representation of token request 234. At 318, security apparatus 220 authenticates the credential information. For example, authentication component 226 can query the data store 227 with the credential information to determine if the credential information corresponds to a valid user account. A result of authentication can be provided to the token generation component 228 where, at 320, a security token 244 is generated. At 322, protocol buffer 224 can serialize security token 244 into a series of bytes. At 324, security apparatus 220 can employ the cryptography component 222 to digitally sign security token 244 to generate a signed security token 242. At 326, the signed security token 244 is sent to the requester 210. At 328, cryptography component 216 of requester 210 verifies the digital signature of signed security token 242 and recovers security token 240. At 330, the protocol buffer 214 de-serializes security token 240 and, at 332, access control component 332 can render access control decisions based at least in part on security token 240.

Referring to FIGS. 4-7, illustrated are example systems depicting various implementations of the security model described above within an industrial automation environment according to one or more aspects. In these example systems, an industrial automation device operates as a requester as described above. As will become evident with these example systems, the security model described above can operate at various levels within the industrial automation environment, from a small-scale integrated environment of a single device to large-scale network wide environments. Accordingly, the security model can provide security within a home domain and, also, can be extended to provide interoperability with foreign domains.

In FIGS. 4-7, and the associated descriptions, a device can be any suitable industrial automation device (e.g., a machine (press, stamp, conveyor, robot, etc.), a controller, an HMI, and so forth) or any other suitable computing device (e.g., a personal computer, a laptop, a mobile device, etc.). In addition, a security apparatus described below in connection with FIGS. 4-7 can be substantially similar to and/or perform similar functionality as security apparatus 110 and 210. Moreover, interactions between devices and security apparatus can occur in a manner consistent with system 100, system 200, and method 300 described supra with respect to FIGS. 1-3.

Figure 4:
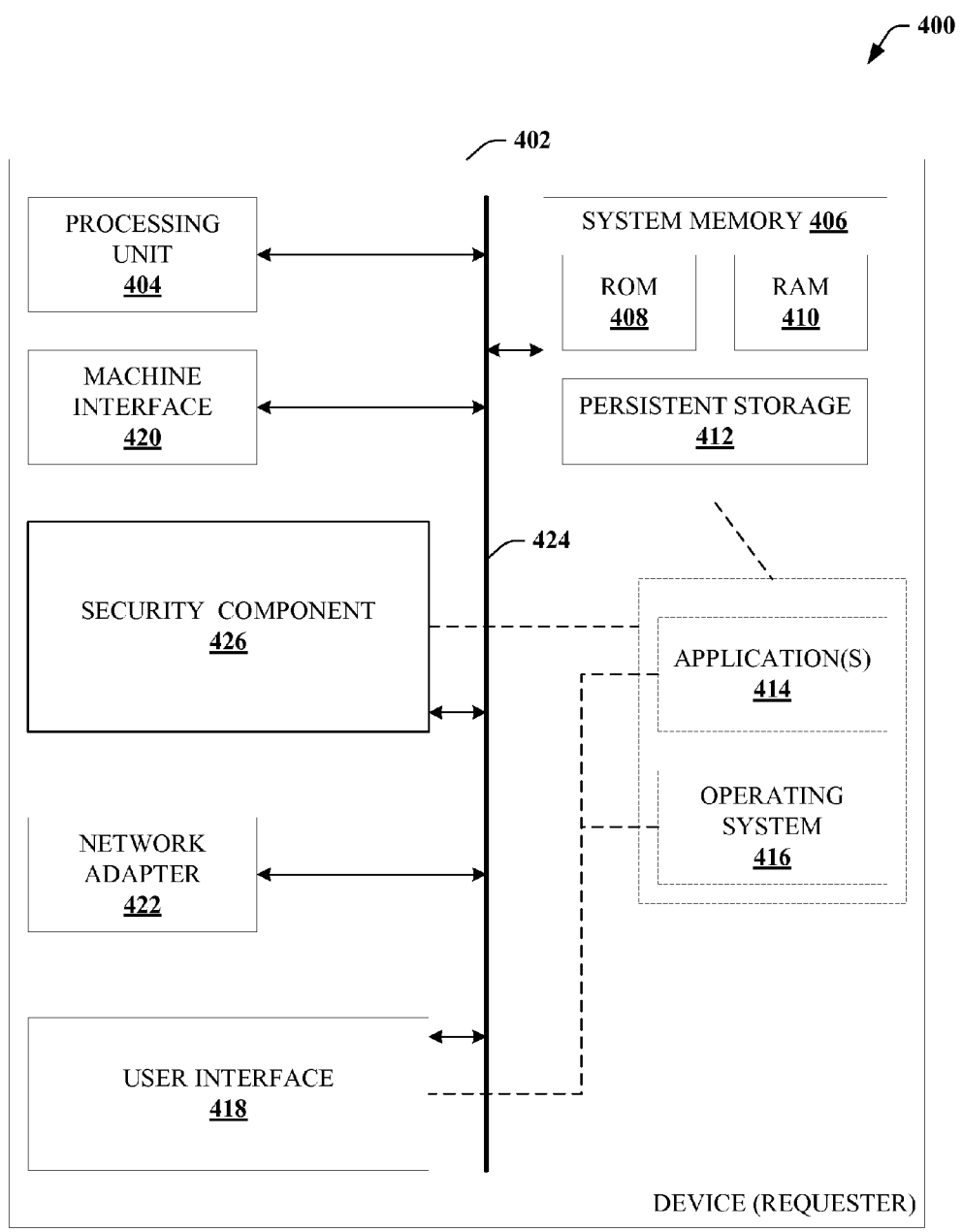
FIG. 4 illustrates a block diagram of an embedded device that utilizes a security token service to identify and authenticate a user of the device according to one or more aspects.

FIG. 4 depicts an example system 400 that includes an embedded device 402 operating as a requester. In an aspect, device 402 can be an embedded system coupled to an industrial automation device such as, but not limited to, a computer, an HMI, a press, a stamping machine, a conveyor, a robot, or any other industrial machine or apparatus deployable within a factory or processing facility.

Device 402 can include a processing unit 404, a system memory 406, a user interface 418, a machine interface 420, and a network adapter 422 interconnected via a bus 422. System memory 406 can include a non-volatile memory, such as ROM 408, and a volatile memory, such as RAM 410. System memory 406 can also include a persistent storage 412, which can include substantially any tangible, non-volatile computer-readable storage media. For instance persistent storage 412 can include media such as, but not limited to, flash memory, a hard disk, a solid state disk drive, a magnetic-based media (e.g., tape, etc.), an optical-based media (e.g., CD-ROM, DVD, Blu-Ray, etc.), or the like.

System memory 406 can retain software and/or firmware programs such as applications 414 and operating system 416. In an aspect, applications 414 and/or operating system 416 can be transferred from ROM 408 and/or persistent storage 412 into RAM 410. Processing unit 404 can execute the applications 414 and operating system 416 from RAM 410 to implement functionality of device 402 and provide interaction with users. For instance, applications 414 and/or operating system 416 can generate a graphical user interface, which is displayed to users via user interface 418.

Device 402 can interface with various mechanical and electrical hardware components of the associated industrial automation device via machine interface 420. Further, device 402 can communicate via a communication network (e.g., a LAN, a DeviceNet, a control network, a WAN, the Internet, etc.) via network adapter 422.

In an aspect, device 402 can utilize an integrated security component 426 to authenticate users. Security component 426 can be integrated onto a circuit board of device 402, wherein the circuit board includes bus 424 and supports the various hardware components (e.g., processing unit 404, system memory 406, machine interface 420, network adapter 422, and user interface 418). According to one aspect, security component 426 can be coupled to bus 424 to communicate with processing unit 404, user interface 418, system memory 406, and/or any applications 414 and operating system 416 executed therefrom. Security component 426 can include an embedded sub-processor (not shown) and memory unit (not shown) to implement security functionality within a secured sub-environment of device 402. In another aspect, security component 426 can implemented via an application 414 and/or operating system 416.

Security component 426 can be substantially similar to and perform similar functionality as security apparatus 110 and 210 described above with reference to FIGS. 1 and 2. For example, security component 426 can issues security tokens in response to token requests that include credential information, as described above.

In an example, a user can supply credential information via user interface 418. For instance, the user can enter a username and password via a login interface of user interface 418, or the user can supply credential information via other mechanisms (e.g., smart card, USB device, an electronic key fob, etc.). The applications 414 and/or operating system 416 can include access control sub-routines that incorporate the credential information into an information structure pre-defined based upon a protocol message definition for a token request. The token request, including the credential information, can be serialized and sent, by the applications and/or operating 416 via an inter-process communication to an application implementing security component 426 or via bus 424 to security component 426 integrated onto the circuit board of device 402. The security component 426 de-serializes the token request, checks the credential information, and generates a security token. The security token can include a set of assertions as described above, and can be organized into a structure pre-defined by another protocol message definition. The security token can be serialized and returned to the requesting entity (e.g., applications 414 and/or operating system 416). The security token is de-serialized and evaluated to render access decisions related to the user. If access is granted, the security token can include additional assertions that define a level of access to grant to the user. Applications 414 and/or operating system 416 provide interactions with the user in accordance with the defined level of access.

Figure 5:
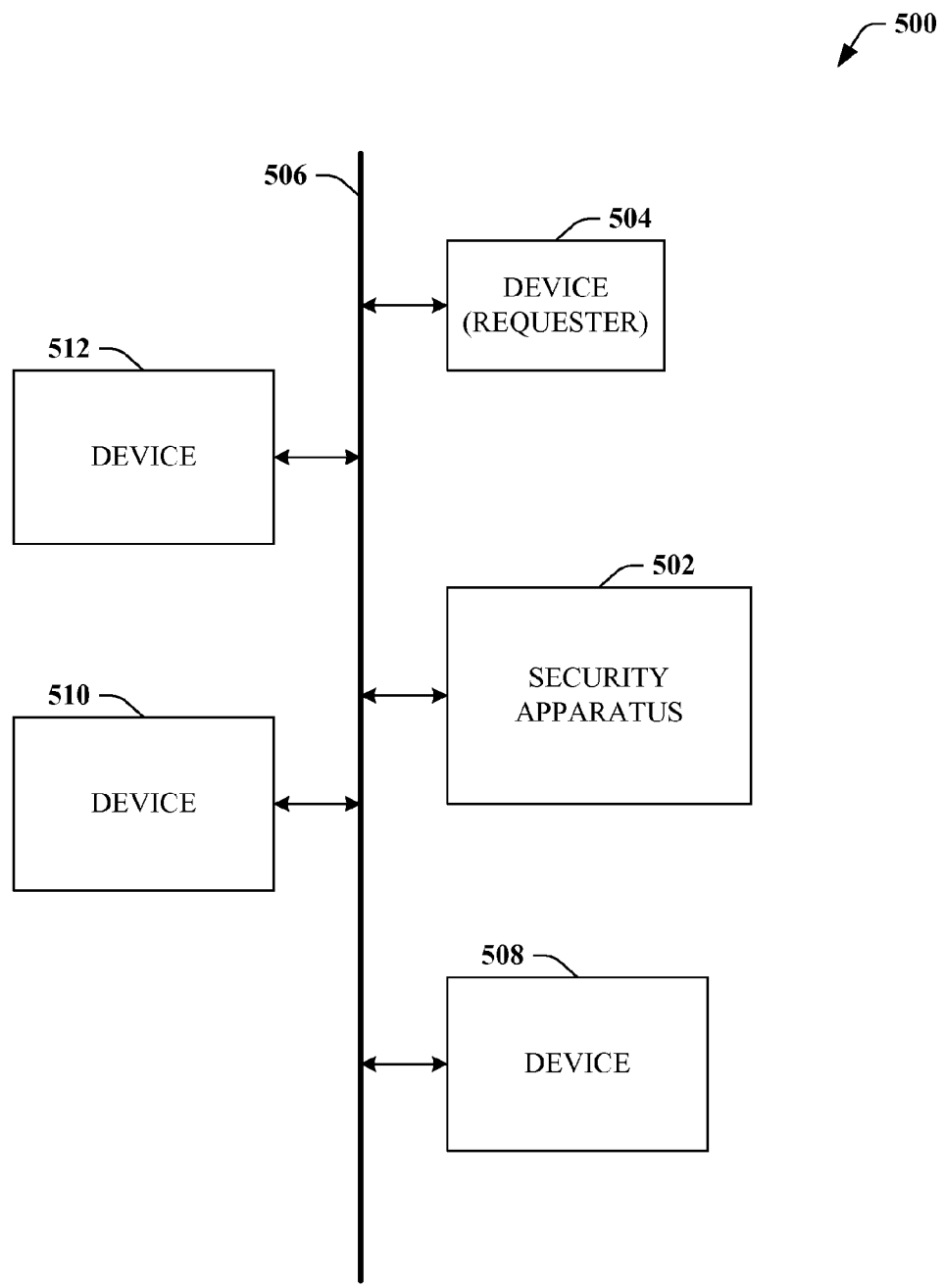
FIG. 5 illustrates a block diagram of an example system that includes a network appliance providing issuance, renewal, and validation of security tokens in accordance with various aspects.

FIG. 5 depicts an example system 500 that includes a network appliance providing issuance, renewal, and validation of security tokens in accordance with various aspects. System 500 can include a security apparatus 502 accessible, via network 506, by device (requester) 504. In an example, security apparatus 502 can be similar to security apparatus 110 and/or 210 described supra. In addition, device 504 can be similar to requester 110, requester 210, and/or device 402 described herein.

In an aspect, device 504 can obtain credential information that requires authentication. Device 504, using protocol buffer mechanisms, can transmit the credential information as a token request to security apparatus 502, via network 504. Security apparatus 502 receives the token request, validates the included credential information, and issues a security token based thereupon. Security apparatus 502 can return the security token to device 504, using protocol buffer mechanisms. Device 504 can analyze the security and determine a level of access to provide to a user associated with the credential information. As shown in FIG. 5, other devices, such as devices 508, 510, and 512, are coupled to network 506. In an aspect, devices 508, 510, and 512 are configured to operate as requesters, as described above. The devices 508, 510, and 512 can submit token requests to security apparatus 502 and obtain security tokens therefrom.

Figure 6:
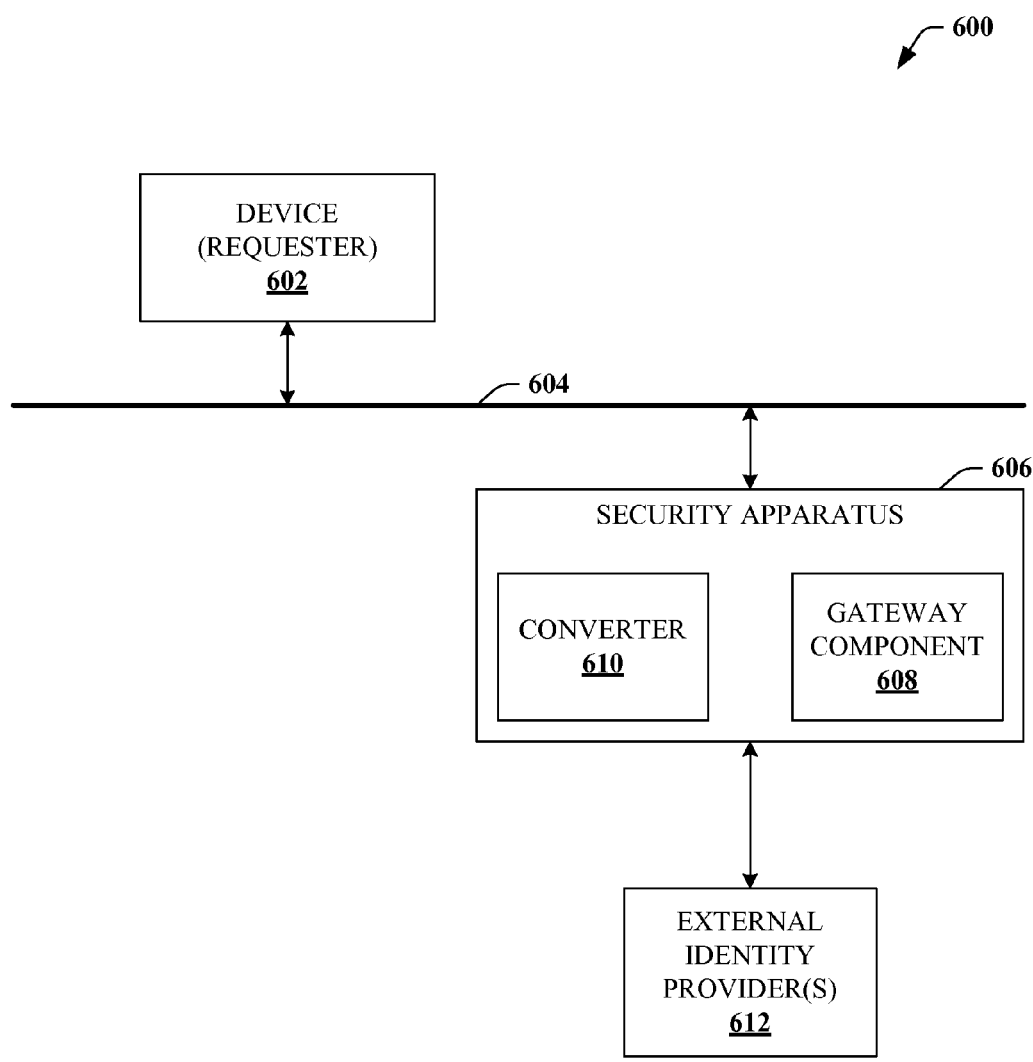
FIG. 6 illustrates a block diagram of an example system that includes a gateway to external identity providers according to one or more aspects.

Turning to FIG. 6, illustrated is an example system 600 in accordance with various aspects. In an aspect, system 600 can include a device 602 configured to request a security token from a security apparatus 606 via a network 604. In the request, device 602 can include credential information provided by a user. In an aspect of system 600, the credential information can be associated with a domain for which security apparatus 606 does not retain associated account information. Instead of issuing a security token directly to device 602, security apparatus 606 can operate as a delegate or proxy and obtain a security token from an external identity provider 612. External identity provider 612 can be a directory server, such as an Active Directory server, an LDAP server, etc., a UNIX domain server, a trusted third party authentication service, or the like.

According to an aspect, security apparatus 606 includes a gateway component 608 configured to request and obtain a security token from the external identity provider 612. Gateway component 608 can request a token from the external identity provider 612 in accordance with the WS-Trust specification for web services. Accordingly, gateway component 608 can obtain a SAML security token from the external identity provider. Security apparatus 606 includes a converter 610 that translates the SAML security token into a protocol buffer security token. The security apparatus 606 can return the protocol buffer security token to device 602 via network 604.

Figure 7:
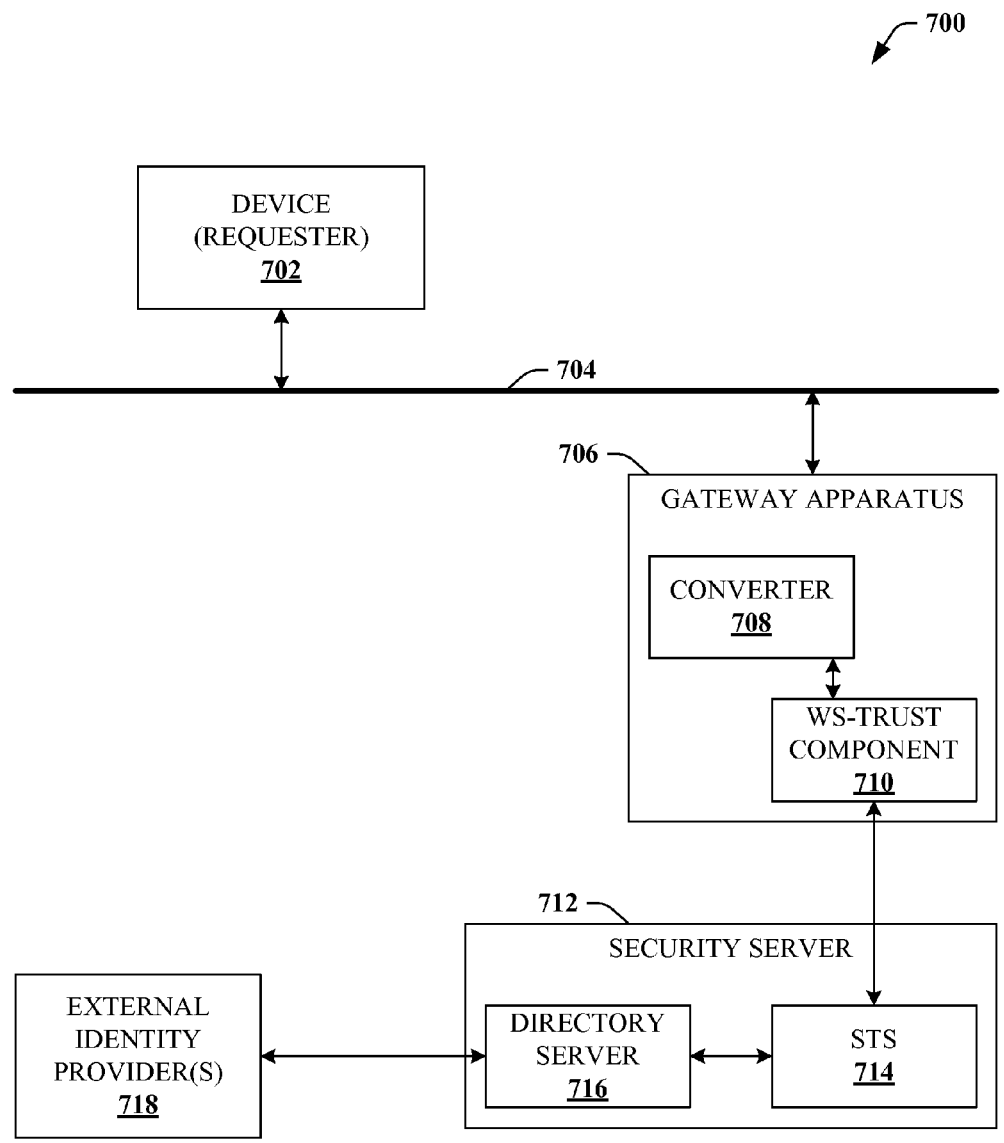
FIG. 7 illustrates a block diagram of an example system that includes a gateway to a security server that interacts with external identity providers in accordance with various aspects.

Referring now to FIG. 7, illustrated is an example system 700 in accordance with various aspects. In an aspect, system 700 can include a device 702 configured to request a security token via a network 704. Device 702 sends a token request, which includes credential information, to a gateway apparatus 706. The gateway apparatus employs the credential information as part of WS-Trust exchange, performed by a WS-Trust component 710, with a security server 712. The security server 712 includes a security token service 714 and a directory server 716. The security token service 714 can issue, renew, or validate security tokens.

According to an example, security token service 714 and/or security server 712 does not retain account information corresponding to the credential information. Accordingly, security token service 714 delegates authentications to directory server 716, which accesses an external identity provider 718 to validate the credential information. Once validated, the security token service 714 can issue a security token and return the token to the WS-Trust component 710 of gateway apparatus 706.

In another aspect, the security token from the security token service 714 can be a SAML token. Accordingly, gateway apparatus includes a converter 708 configured to translate the SAML security token into a protocol buffer security token. The gateway apparatus 706 can return the protocol buffer security token to device 702 via network 704.

Figure 8:
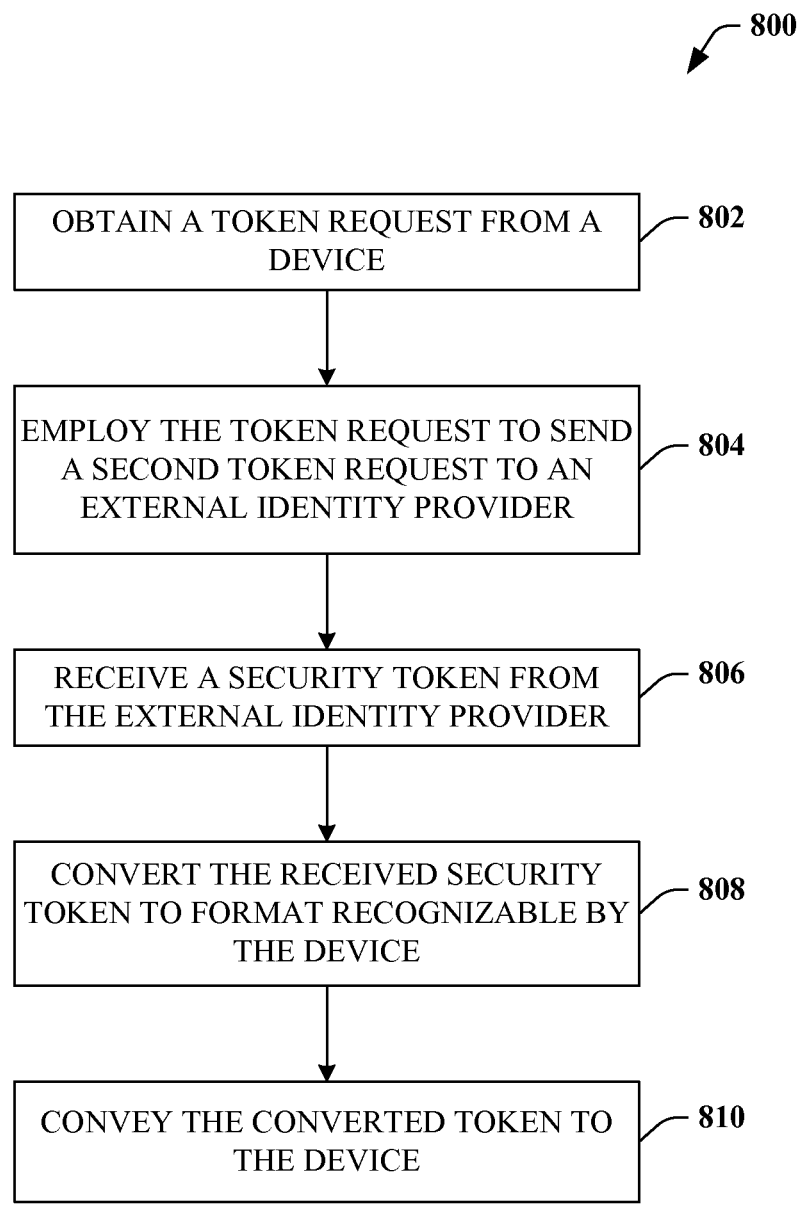
FIG. 8 illustrates a flow diagram of an example method for bridging with foreign security domains in accordance with various aspects.

Referring to FIG. 8, a method 800 for bridging with foreign security domains is illustrated. At 802, a token request is obtained from a device. At 804, the token request is employed to send a second token request to an external identity provider. In an aspect, the first token request can in a protocol buffer format utilized by the device and the second token request can be in an XML format specified in the WS-Trust standard utilized by web services and enterprise systems. At 806, a security token is received from the external identity provider. In an example, the security token can be a SAML security token. However, it is to be appreciated that the security token can be formatted as a Kerberos ticket, an X.509 token, or the like. At 808, the received security token is converted to a format recognizable by the device. According to an aspect, the recognizable format can be a protocol buffer encoding of a security token. At 810, the protocol buffer encoding of the security token is conveyed to the device.

Figure 9:
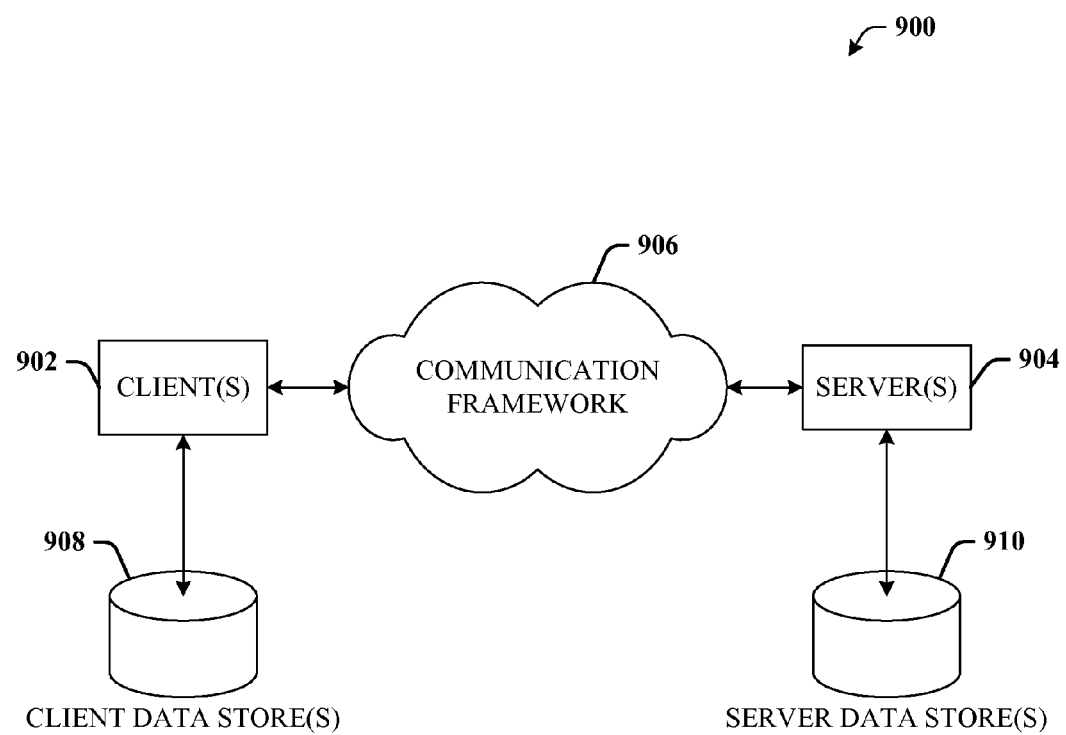
FIG. 9 illustrates a schematic block diagram of an exemplary computing environment, according to an aspect
Figure 10:
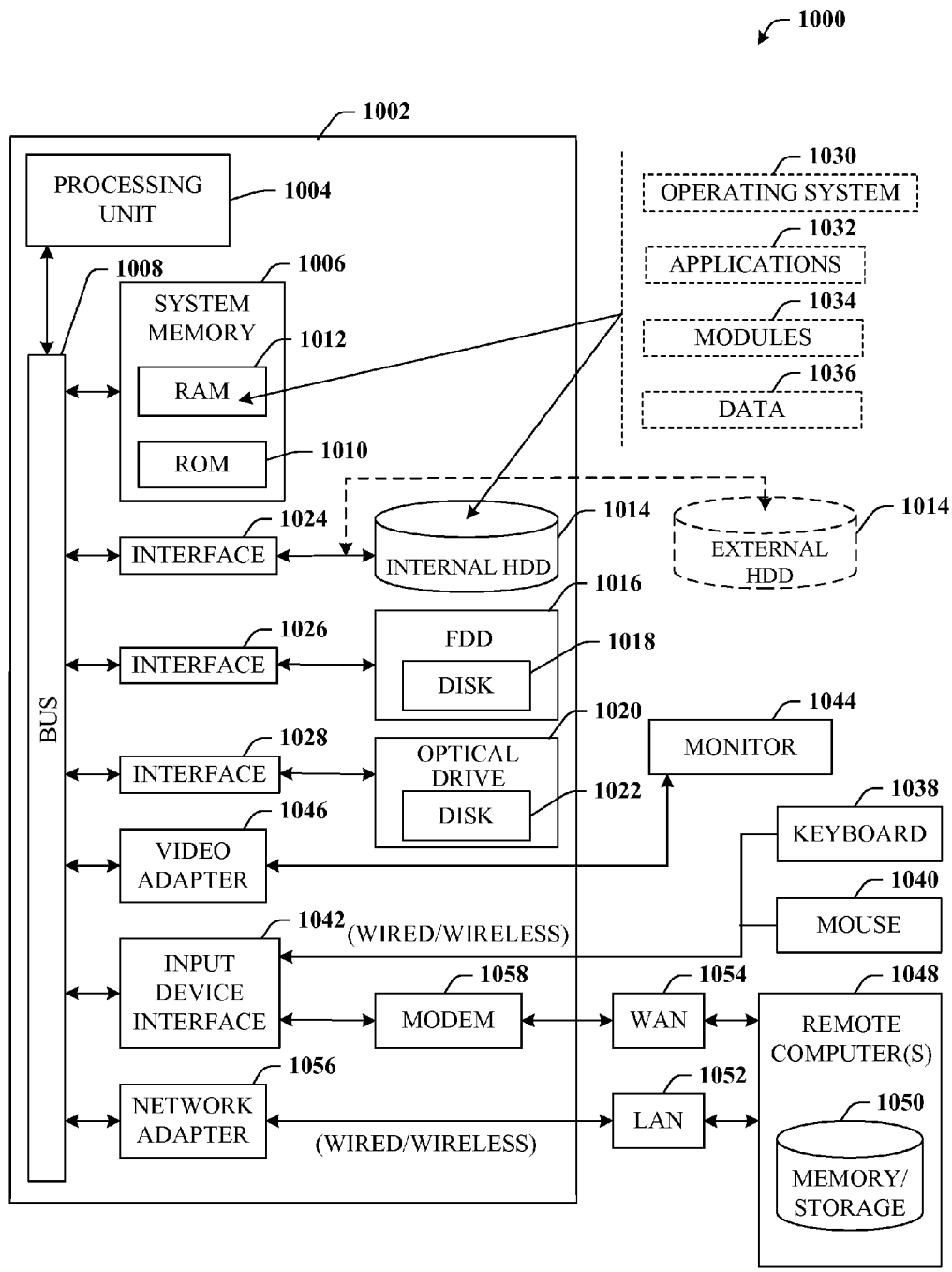
FIG. 10 illustrates a block diagram of a computer operable to execute the disclosed aspects.

In order to provide additional context for implementing various aspects of the claimed subject matter, FIGS. 9 and 10 and the following discussion is intended to provide a brief, general description of a suitable computing environment in which the various aspects of the subject innovation may be implemented. For example, the host application as well as the extensible framework can be implemented in such suitable computing environment. While the description above is in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring now to FIG. 9, there is illustrated a schematic block diagram of an exemplary computer compilation system operable to execute the disclosed architecture. The system 900 includes one or more client(s) 902. The client(s) 902 can be hardware and/or software (e.g., threads, processes, computing devices). In one example, the client(s) 902 can house cookie(s) and/or associated contextual information by employing one or more features described herein.

The system 900 also includes one or more server(s) 904. The server(s) 904 can also be hardware and/or software (e.g., threads, processes, computing devices). In one example, the servers 904 can house threads to perform transformations by employing one or more features described herein. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

With reference to FIG. 10, an exemplary environment 1000 for implementing various aspects described herein includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, a serial port, an IEEE-1394 port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10 BaseT wired Ethernet network.

As utilized herein, terms "component," "system," "creator," "module," "node," "framework," "application," "translator," and the like, are intended to refer to a computer-related entity or solid-state electronic, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. In addition, a component can be hardware or solid state electronic such as an electronic circuit, a semiconductor device, etc.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A network appliance, comprising:
a processor;
a memory communicatively coupled to processor, the memory having stored therein computer-executable instructions, comprising:
a protocol buffer component configured to:
receive a first series of bytes representing a token request having credential information from a requestor;
de-serialize the first series of bytes into a token request protocol message object retaining the credential information, wherein the token request protocol message object is formatted according to a Protocol Buffer definition;
convert the token request protocol message object into a second token request protocol message object having a first format associated with an external entity; and
a security token service configured to:
send the second token request protocol message object to the external entity;
receive a first protocol buffer security token, having a representation not formatted according to the Protocol Buffer definition, from the external entity;
convert the first protocol buffer security token into a second protocol buffer security token structured in accordance with the Protocol Buffer definition;
serialize the second protocol buffer security token into a second series of bytes; and
communicate the second series of bytes as a response to the token request.

2. The network appliance of claim 1, wherein the Protocol Buffer definition is programming language neutral, execution platform neutral, and extensible.

3. The network appliance of claim 1, further comprising a cryptography component configured to verify a digital signature attached to the token request.

4. The network appliance of claim 3, wherein the cryptography component is further configured to digitally sign the first protocol buffer security token.

5. The network appliance of claim 1, wherein the security token component further comprises an authentication component configured to validate the credential information with a data store that stores account information.

6. The network appliance of claim 1, further comprising a protocol buffer compiler configured to compile the Protocol Buffer definition into a serialization mechanism configured to serialize token request protocol message objects into series' of bytes.

7. The network appliance of claim 1, further comprising a protocol buffer compiler configured to compile the Protocol Buffer definition into a de-serialization mechanism configured to de-serialize series of bytes into token request protocol message objects.

8. The network appliance of claim 1, further comprising a protocol buffer compiler configured to compile the Protocol Buffer definition into a data access mechanism configured to access data in token request protocol message objects.

9. A system, comprising:
a processor;
a memory communicatively coupled to processor, the memory having stored therein computer-executable instructions, comprising:
a gateway component configured to:
receive a first series of bytes representing a token request having credential information from a requestor;
de-serialize the first series of bytes into a token request protocol message object retaining the credential information, wherein the token request protocol message object is formatted according to a Protocol Buffer definition;
convert the token request protocol message object into a second token request protocol message object having a first format associated with an external entity;
send the second token request protocol message object to the external entity;
receive a first protocol buffer security token, having a representation not formatted according to the Protocol Buffer definition, from the external entity;
convert the first protocol buffer security token into a second protocol buffer security token structured in accordance with the Protocol Buffer definition;
serialize the second protocol buffer security token into a second series of bytes; and
communicate the second series of bytes as a response to the token request.

10. The system of claim 9, wherein the gateway component is further configured to verify a digital signature attached to the token request.

11. The system of claim 10, wherein the gateway component is further configured to digitally sign the first protocol buffer security token.

12. The system of claim 9, wherein the gateway component is further configured to compile the Protocol Buffer definition into a serialization mechanism configured to serialize token request protocol message objects into series' of bytes.

13. The system of claim 9, wherein the gateway component is further configured to compile the Protocol Buffer definition into a de-serialization mechanism configured to de-serialize series of bytes into token request protocol message objects.

14. The system of claim 9, wherein the gateway component is further configured to compile the Protocol Buffer definition into a data access mechanism configured to access data in token request protocol message objects.

15. A method, comprising:
- obtaining, by a security apparatus including a processor, a token request, as a series of bytes, that includes credential information to be authenticated;
- de-serializing, by the security apparatus, the series of bytes to obtain the token request as an object structured in accordance with a Protocol Buffer definition;
- converting, by the security apparatus, the token request, structured in accordance with the Protocol Buffer definition, into a second token request having a format associated with an external entity;
- sending, by the security apparatus, the second token request to the external entity;
- receiving, by the security apparatus, a first security token, having a representation not formatted according to the Protocol Buffer definition, from the external entity;
- converting, by the security apparatus, the first security token into a second security token structured in accordance with the Protocol Buffer definition;
- serializing, by the security apparatus, the second security token into a byte stream; and
- communicating, by the security apparatus, the byte stream as a response to the token request.

16. The method of claim 15, further comprising verifying, by the security apparatus, a digital signature attached to the token request.

17. The method of claim 16, further comprising, by the security apparatus, digitally signing the first protocol buffer security token.

18. The method of claim 15, further comprising compiling, by the security apparatus, the Protocol Buffer definition into a serialization mechanism configured to serialize objects structured in accordance with the Protocol Buffer definition into series' of bytes.

19. The method of claim 15, further comprising compiling, by the security apparatus, the Protocol Buffer definition into a de-serialization mechanism configured to de-serialize byte streams into objects structured in accordance with the Protocol Buffer definition.

20. The method of claim 15, further comprising compiling, by the security apparatus, the Protocol Buffer definition into a data access mechanism configured to access data in objects structured in accordance with the Protocol Buffer definition.

* * * * *